United States Patent [19]

Cinadr

[11] 4,336,351

[45] Jun. 22, 1982

[54] MODIFIED EP AND EPDM BLENDS WITH A COLD FLOW ADDITIVE

[75] Inventor: Bernard F. Cinadr, Brecksville, Ohio

[73] Assignee: The B. F. Goodrich Company, Akron, Ohio

[21] Appl. No.: 237,231

[22] Filed: Feb. 23, 1981

Related U.S. Application Data

[63] Continuation-in-part of Ser. No. 117,607, Feb. 7, 1980, abandoned.

[51] Int. Cl.³ .................... C08L 23/16; C08L 23/12
[52] U.S. Cl. .................................. 525/211; 525/240
[58] Field of Search ............................. 525/240, 211

[56] References Cited

U.S. PATENT DOCUMENTS

| | | | |
|---|---|---|---|
| 3,665,059 | 5/1972 | Mahlman | 525/240 |
| 3,835,201 | 9/1974 | Fischer | 525/240 |
| 4,031,169 | 6/1977 | Morris | 525/240 |
| 4,036,912 | 7/1977 | Stricharczuk | 525/240 |

*Primary Examiner*—Carman J. Seccuro
*Attorney, Agent, or Firm*—George A. Kap

[57] ABSTRACT

Ethylene and propylene copolymers and terpolymers are modified by addition of up to about 20% of crystalline polypropylene in order to reduce plastic flow which said copolymers and terpolymers undergo during storage but without significantly altering original physical properties thereof.

9 Claims, No Drawings

MODIFIED EP AND EPDM BLENDS WITH A COLD FLOW ADDITIVE

REFERENCE TO A RELATED APPLICATION

This is a continuation-in-part application of application Ser. No. 117,607 filed Feb. 7, 1980, now abandoned.

BACKGROUND OF THE INVENTION

Polymers of ethylene and propylene constitute important articles of commerce for numerous applications such as hose, belts, coated fabrics, wire insulation and jacketing, soles and heels, sponges, and passenger tires. These polymers, which display outstanding processing characteristics, have Mooney viscosities (ML-4/212° F.) in the range of about 10 to 100. Unfortunately, in their uncured state, these polymers tend to flow in storage. The problem of cold-flow has been most acute with the lowest viscosity grades of such polymers although even the higher viscosity grades tend to exhibit this behavior during the warmer months of the year.

The problem of cold-flow is encountered in the storage of raw and uncured polymers which are generally stored in bags prior to use. During storage and transportation, the bags of raw polymers are stacked on top of each other in a cardboard carton to a height exceeding several feet. Due to cold-flow, the bags at the lower portion of the pile have occasionally burst under the weight of the material above it. This can lead to serious finishing and high plant clean-up losses as well as bale-to-bale adhesion and cardboard contamination.

There are many patents that disclose the use of polypropylene in connection with polymers of ethylene and propylene and in many instances, other substances, however, none of these patents disclose blending of polypropylene with raw and uncured polymers of ethylene and propylene to counteract cold-flow properties thereof. For instance, U.S. Pat. No. 3,536,653 to Bickel discloses EP rubber compositions containing extender oil and polypropylene to improve tackiness. On the basis of 100 parts of the EP rubber, amount of extender oil used is in excess of 50 parts and amount of polypropylene can vary from 2.5 to 50 parts. U.S. Pat. No. 4,086,301 to Zerpner discloses EP and EPDM rubbers containing a crosslinking agent and 5 to 100 parts of polypropylene per 100 parts of the rubber. Addition of the crosslinking agent and polypropylene is made to render the rubber readily heat-sealable. U.S. Pat. No. 3,564,080 to Pedretti discloses EP and EPDM rubbers containing a curing agent and an atactic, linear, substantially amorphous polypropylene having molecular weight of 14,000 to 48,000 as extender or diluent for the rubber which is added to the rubber on a roll mixer. Amount of polypropylene can vary from 1 to 90 parts to 100 parts of rubber.

U.S. Pat. No. 3,361,850 to Young describes a solution to the cold-flow problem of the polymers by addition thereto of up to 5% low density polyethylene. It has been confirmed that high density polyethylene does not provide the desired improvement in the cold-flow property. The problem with the polymer blends containing low density polyethylene is that products manufactured from such blends exhibit the undesirable reduction in impact strength at low temperatures. It is desirable, therefore, to overcome the cold-flow problem with respect to EP and EPDM rubbers without incurring the adverse affect relative to impact strength at low temperatures.

SUMMARY OF THE INVENTION

This invention relates to raw and uncured EP and EPDM polymers that normally exhibit elastic flow under ambient temperature containing a sufficient amount of polypropylene to substantially reduce cold-flow of such polymers without significantly altering physical properties thereof. The product herein is an intermediate and its original properties remain essentially unchanged. It does not appear that low temperature impact strength of articles made from such polymers is adversely affected by incorporation of polypropylene.

DETAILED DESCRIPTION OF THE INVENTION

It was discovered that cold-flow problems of EP and EPDM raw rubbers can be overcome by blending a sufficient amount of polypropylene therewith. The polypropylenes suitable for blending with the elastomeric polymers include crystalline or isotactic polypropylene which has greater than 90% hot heptane insolubles. Such polypropylene resins have densities of about 0.89 to about 0.91 g/cc and melt flow rates ranging from about 0.5 to 30 g/10 minutes (MFR, 230° C., 2160 g load). It is preferred to employ polypropylene with a melt flow rate of about 1 to 20 g/10 minutes, and more preferably, with a melt flow rate of 4 to 12, as measured at 230°. Molecular weight (Mw) of crystalline polypropylene suitable for my purpose can vary from about 180,000 to 500,000 and preferably from about 250,000 to 350,000. Particle size of polypropylene is not critical; pelleted polypropylene of about ⅛" average particle size or powder is generally used. Powder is generally defined as consisting of about 0.1 to 1 millimeter average particle size. The use of very small particles, however, will lead to a tougher composition which would be more difficult to process.

Amount of polypropylene used with the elastomeric polymers should be sufficient to overcome or reduce the cold-flow property. On the basis of empirical studies, amount of polypropylene can vary from about 0.5 to 20%, based on the weight of the elastomeric polymers, preferably from 1 to 10 parts.

The EP copolymers of ethylene and propylene, and EPDM terpolymers of ethylene, propylene and a minor amount of a diene are elastomers which exhibit plastic flow to a perceptible degree under the conventional temperature and storage conditions employed in the rubber trade. Such elastomeric polymers, especially amorphous polymers, should have an uncompounded or raw Mooney viscosity ML (1+4) at 250° F. of 10 to 100, preferably 20 to 40, and crystallinity at room temperature without stretch of 0 to 15%, especially 0 to 10%. The compositions described herein appear to be heterogeneous dispersions of polypropylene in the polymers without any evidence of a continuous polypropylene phase. The polymers are essentially linear and of low molecular weight, preferably about 80,000 to 120,000 for amorphous linear EP copolymers and 120,000 to 180,000 for partially crystalline linear EP copolymers. This is viscosity average molecular weight which is obtained by gel permeation chromatography. Some of the other more important properties of the unmodified raw and uncured polymers include yield strength of about 20 to 200 psi, ultimate tensile strength of about 20 to 300 psi, gel content of 1% or less, zero shear viscosity of about $1 \times 10^5$ to $1 \times 10^7$, and a low ethylene sequence index of less than about 25. Materials of high ethylene sequence index, i.e., in excess of about 30, do not flow.

Ethylene content of such elastomeric polymers should be at least about 40 mole %, preferably at least 50 mole %, the balance being propylene, and in the case of the terpolymers, a minor amount of a diene on the order of less than about 10 mole % and usually not over 5%.

The preferred dienes are nonconjugated dienes. The nonconjugated diene can be any one or more of those generally known in the art but preferably is 1,4-hexadiene, ethylidene norbornenes, cyclooctadiene or dicyclopentadiene. Minor amounts of other copolymerizable monomers such as hexene, butene and so forth, can be used as long as they do not adversely affect the properties of the elastomeric polymers. Blends of the polymers can be used as well as mixtures of dienes. The elastomeric polymers can have high or low Mooney viscosities, can be crystalline or amorphous, and can have high to low crystalline content, as long as the polymer blends fall within the definition set forth above. The elastomeric polymers discussed herein, and their methods of preparation and curing, are well known in the art and are commercially available.

It has been determined that increase in viscosity of the EP or EPDM polymers due to the presence of polypropylene is not the mechanism responsible for increased resistance to flow. It was found that Mooney viscosity increased by 12–15 points at 100° C. by the addition of 5% polypropylene, however, the resistance to flow was much greater than can be attributed to the increased viscosity.

EXAMPLES

The copolymers of ethylene and propylene used in these examples were prepared in a conventional manner by polymerizing in suspension ethylene and propylene in the presence of vanadium catalyst copolymers containing about 60 mol percent ethylene and about 40 mol percent propylene. Please refer to U.S. Pat. No. 3,702,840 for further description of the preparation procedure. Propylene and the copolymer were mixed and pressed repeatedly about five times until a film of uniform clarity was formed. Slabs about 80 mils thick were prepared from the mixture and the copolymers by compression molding between Mylar sheets in a tensile mold. Test specimens were prepared from plied disks cut with a circular die from the molded slabs, with care being taken to exclude air pockets.

Flow characteristics of the blends were measured with a Wallace parallel plate plastometer. Test specimens were conditioned for a minimum of 16 hours at the test temperature and then subjected to a compressive load of 5000 grams. Sample thickness was determined as a function of time under load.

The table below gives results in terms of percent compression of the control and test samples at 75° F. using the indicated amounts of polypropylene. All the test samples 1 to 8 were prepared with an EP copolymer of about 60,000 molecular weight, which was Control A; Control B was also an EP copolymer but its molecular weight was about 80,000. Test samples 10 and 11 were prepared with a partially crystalline EP copolymer. Pro-Fax ® polypropylene from Hercules of different melt flow index was used. Moplen ® propylene was obtained from Montedison. Data for the subject experiments is presented below:

| Amount of Polypropylene | Melt Index | Time in Minutes Under Load | | | | | | |
|---|---|---|---|---|---|---|---|---|
| | | 2 | 5 | 10 | 30 | 60 | 120 | 240 |
| 1 Control A | | 13 | 23 | 33 | 47 | 55 | — | — |
| 2 5% Pro-Fax 6723 | 0.8 | 1 | 2 | 3 | 7 | 10 | 15 | 20 |
| 3 5% Pro-Fax 6523 | 4 | 1 | 2 | 2 | 3 | 4 | 5 | 7 |
| 4 2% Pro-Fax 6523 | 4 | 5 | 9 | 13 | 22 | 29 | 36 | 44 |
| 5 5% Pro-Fax 6323 | 12 | 1 | 1 | 1 | 2 | 3 | 4 | 5 |
| 6. 5% Moplen F300 | 30 | 4 | 8 | 13 | 25 | 33 | 40 | — |
| 7 5% Pro-Fax 8523 | 4 | 5 | 10 | 15 | 27 | 35 | 43 | 50 |
| 8 Control B | | 3 | 5 | 8 | 15 | 21 | 28 | 34 |
| 9 Control C+ | | 6 | 9 | 11 | 16 | 20 | 24 | — |
| 10 5% Pro-Fax 6523+ | 4 | 4 | 6 | 8 | 11 | 14 | 16 | 20 |
| 11 10% Pro-Fax 6323+ | 12 | 1 | 1 | 1 | 2 | 2 | 2 | 3 |

+Temperature of 120° F.

I claim:

1. A raw and uncured heterogeneous composition that does not have a continuous polypropylene phase comprising, an essentially linear polymer of ethylene and propylene which normally exhibits plastic flow under ambient temperatures and storage conditions, said polymer of ethylene and propylene having yield strength of about 20 to 200 PSI, ultimate tensile strength of about 20 to 300 PSI, gel content of 1% or less and a low ethylene sequence index of less than about 25, and a sufficient amount up to about 20% by weight of added crystalline polypropylene having an average particle size of about ⅛" or in the range of about 0.1 to 1 millimeter to reduce the plastic flow but without significantly altering original physical properties of said polymer.

2. Composition of claim 1 wherein amount of said polypropylene is up to about 20% by weight based on the total weight of said polymer, said polypropylene having a melt flow rate of 0.5 to 30 g/10 min.

3. Composition of claim 2 wherein the polymer is selected from copolymers of ethylene and propylene and from terpolymers of ethylene, propylene and a diene.

4. Composition of claim 3 wherein the ethylene content of said copolymers and terpolymers is at least 40 mole %, the diene content of said terpolymers is less than about 10 mole %, and amount of said polypropylene is 1 to 10%.

5. Composition of claim 4 wherein the diene of said terpolymers is selected from 1,4-hexanediene, ethylidene norbornenes, dicyclopentadienes, cyclooctadienes, and mixtures thereof.

6. Composition of claim 3 wherein melt flow of said polypropylene is 1 to 20 g/10 min and amount thereof is 1 to 10%.

7. Composition of claim 4 wherein density of said polypropylene is 0.89 to 0.91 g/cc and its melt flow rate is 4 to 12/10 min.

8. Composition of claim 7 wherein said polypropylene is in a particulate form of about ⅛″ average particle size.

9. Composition of claim 2 wherein said polypropylene is in a powder form.

* * * * *